June 14, 1955
G. C. LUTHER
2,710,567
MACHINE FOR MAKING FILE FOLDERS, FILING GUIDES, ETC
Filed May 14, 1951
4 Sheets-Sheet 1
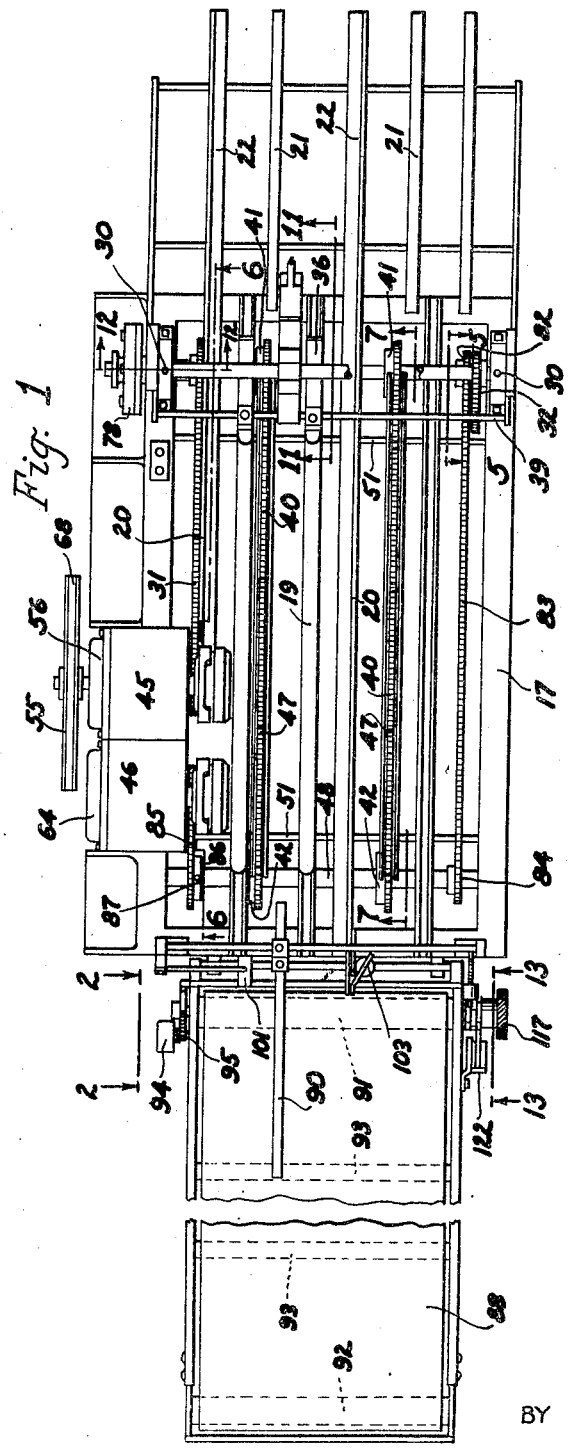
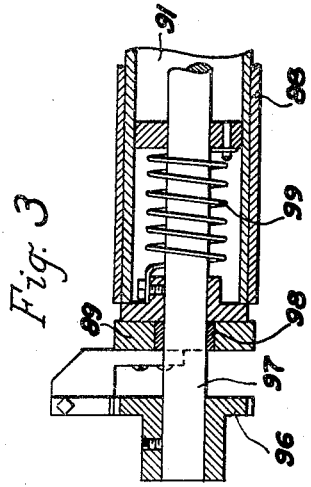
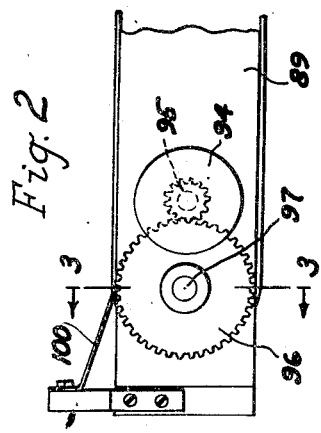
INVENTOR.
GLENN C. LUTHER
BY *G. H. Braddock*
ATTORNEY June 14, 1955
G. C. LUTHER
2,710,567
MACHINE FOR MAKING FILE FOLDERS, FILING GUIDES, ETC
Filed May 14, 1951
4 Sheets-Sheet 2
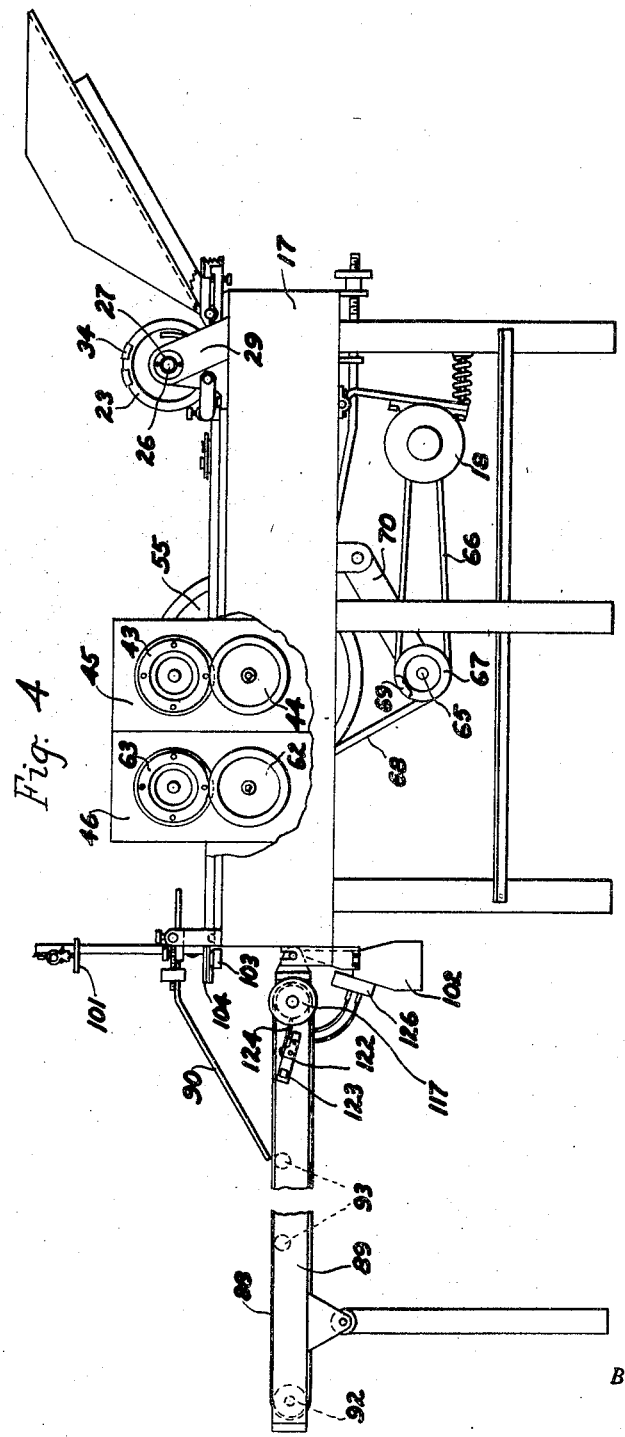
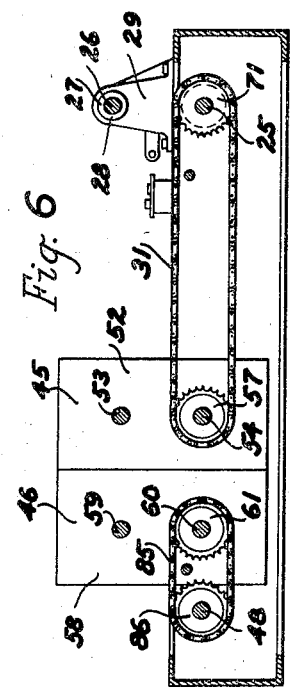
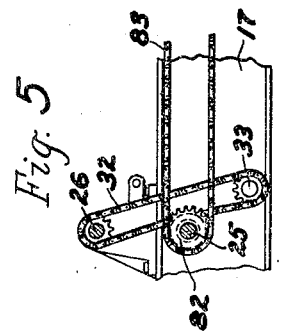
INVENTOR.
GLENN C. LUTHER
BY
*J. H. Braddock*
ATTORNEY.

June 14, 1955  G. C. LUTHER  2,710,567
MACHINE FOR MAKING FILE FOLDERS, FILING GUIDES, ETC
Filed May 14, 1951  4 Sheets-Sheet 3

INVENTOR.
GLENN C. LUTHER
BY
ATTORNEY

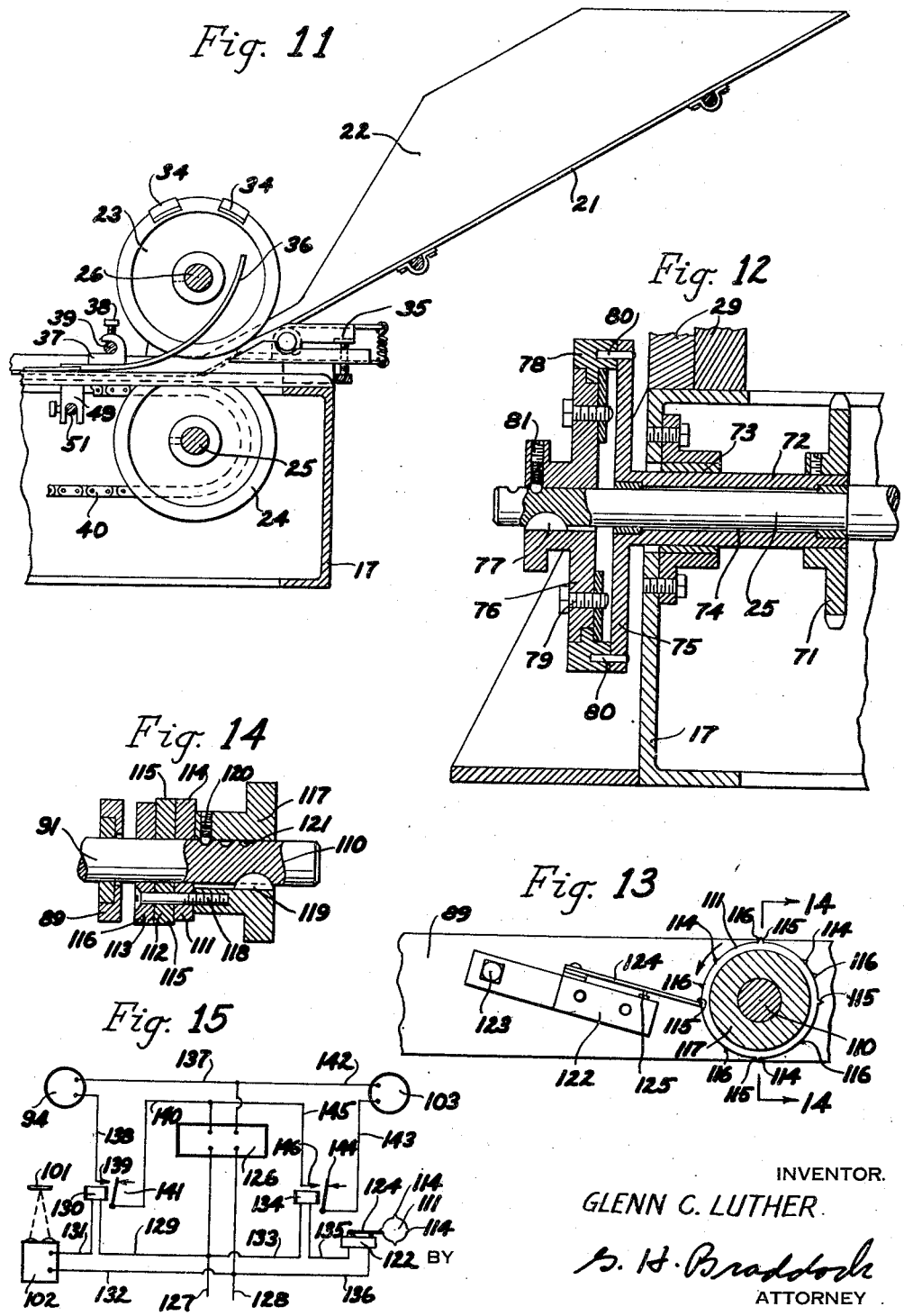

United States Patent Office 2,710,567
Patented June 14, 1955

2,710,567

MACHINE FOR MAKING FILE FOLDERS, FILING GUIDES, ETC.

Glenn C. Luther, Brooklyn Center, Minn., assignor to The Olm Company, Minneapolis, Minn., a copartnership Application May 14, 1951, Serial No. 226,249

2 Claims. (Cl. 93—93)

The object of this invention is to provide a machine for making file folders, filing guides, etc., and for indicating the number of folders, guides or articles made in the machine from time to time, which will incorporate novel and improved features and characteristics of construction.

In the accompanying drawings forming a part of this specification,

Fig. 1 is a top plan view of a machine for making articles such as file folders, filing guides, etc., and for indicating the number of articles made, incorporating features and characteristics of the invention;

Fig. 2 is an enlarged elevational view detailing operative mechanism of the machine, taken from the position of line 2—2 in Fig. 1;

Fig. 3 is a detail sectional view, taken on line 3—3 in Fig. 2;

Fig. 4 is a side elevational view of the machine of Fig. 1;

Fig. 5 is a vertical longitudinal sectional view, taken on line 5—5 in Fig. 1;

Fig. 6 is a vertical longitudinal sectional view, taken on line 6—6 in Fig. 1;

Fig. 11 is an enlarged vertical longitudinal sectional view, taken on line 11—11 in Fig. 1;

Fig. 12 is an enlarged vertical transverse sectional view, taken on line 12—12 in Fig. 1;

Fig. 13 is an enlarged vertical longitudinal sectional view, taken on line 13—13 in Fig. 1;

Fig. 14 is a detail sectional view, taken as on line 14—14 in Fig. 13; and

Fig. 15 is a diagrammatic view of an electrical system of or for the machine.

Figure 7:
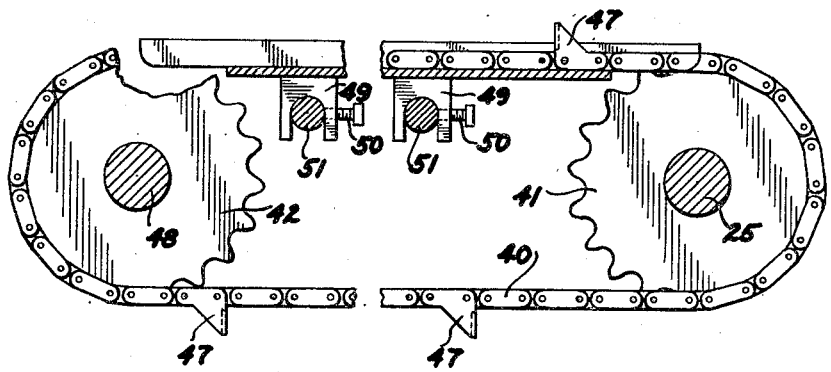
Fig. 7 is an enlarged vertical longitudinal sectional view, taken on line 7—7 in Fig. 1.

With respect to the drawings and the numerals of reference thereon, 17 denotes a frame of the machine supporting an electric motor 18 situated below bars 19 and angle pieces 20 of said frame extending longitudinally of the machine. Together, the bars 19 and angle piece 20 constitute a horizontal platform, and said angle pieces are guide elements at opposite sides of the horizontal platform.

An oblique platform, for sheets of paper, such, for example, as file folders, or filing guides, to be fed forwardly in the machine, consists of longitudinal bars 21 and angle pieces 22. As will be clear from Fig. 1 of the drawings, the angle pieces 20 and 22 are in alinement longitudinally of the machine. The angle pieces 22 are guide elements at the opposite sides of the oblique platform.

Sheets of paper, or other material, are fed by gravity to upper and lower feed rollers, designated 23 and 24, respectively. The lower feed roller 24 is fixed on a transverse shaft 25 suitably and conveniently mounted on the machine frame, and the upper feed roller 23 is fixed on a transverse shaft 26 mounted on said machine frame for adjustment toward and away from and laterally of the transverse shaft 25. More explicitly stated, the transverse shaft 26 is eccentrically mounted in bearing elements 27 themselves mounted for rotatable adjustment in bearings 28 of bracket members 29 upon the machine frame at opposite ends of the transverse shaft 26. See Figs. 1, 4, 6, 9, 10 and 12. Set screws 30 are for fastening the bearing elements 27 in adjusted position. The transverse shaft 26 is adjustable to the end that the upper and lower feed rollers 23 and 24 may be set at desired relation to each other to properly perform their intended function. The shaft 25 is driven by a chain drive 31, and the shaft 26 is driven by a chain drive 32 itself driven from the shaft 25 and riding an idler pulley 33. See Figs. 1 and 5. Inserts 34, desirably of rubber, in the upper feed roller 23 are for facilitating removal of individual sheets from the oblique platform. An adjustable rack 35 directs the file folders from the oblique platform to and between the upper and lower feed rollers 23 and 24, and curvilinear guide strips 36 for the file folders are rigid with the elements 37 secured, as at 38, to a transverse rod 39 fixed upon the machine frame.

The upper and lower feed rollers 23 and 24 deposit the individual sheets on the horizontal platform. Longitudinally extending chains 40, mounted on sprocket wheels 41 and 42, are for advancing the individual sheets to rotatable, upper and lower, complementary annular die cutters, denoted 43 and 44, respectively, of a first paper cutting unit 45. Spaced feeding lugs 47, rigid with each chain 40 and projecting above the horizontal platform, successively engage the rear edges of successive sheets thus to feed them to the die cutters while being guided by oppositely facing angle pieces 20, 20. The sprocket wheels 41 are fixed on the transverse shaft 25 and the sprocket wheels 42 are freely rotatable on a transverse shaft 48 suitably and conveniently mounted on the machine frame. Supports 49 for upper lengths of the longitudinally extending chains 40 are rigidly secured, as at 50, upon transverse rods 51 supported on said machine frame. See Figs. 1, 7 and 11.

The paper cutting unit 45 includes a bearing member 52 suitably and conveniently mounted on the machine frame and rotatably supporting upper and lower, parallel shafts, represented 53 and 54, respectively, to be driven in opposite directions. A pulley 55 is fixed upon an end of the lower shaft 54 of the paper cutting unit 45 situated externally thereof, and upper and lower gears (not shown) fixed upon said upper and lower shafts 53 and 54 and situated within a housing 56 upon said bearing member 52 of the paper cutting unit 45 are in mesh with each other. A sprocket 57 fixed upon an end portion of the lower shaft 54 of said unit 45 opposite the pulley 55 is disposed inwardly of and in adjacent relation to the lower annular die cutter 44 fixed upon said lower shaft and adapted to cooperate with the upper annular die cutter 43 fixed upon the end of the upper shaft 53 at the same side of the bearing member 52.

A second paper cutting unit 46 includes a bearing member 58 suitably and conveniently mounted on the machine frame adjacent the bearing member 52 of the first paper cutting unit 45 and rotatably supporting upper and lower, parallel shafts, designated 59 and 60, respectively, also to be driven in opposite directions. A sprocket 61 is fixed upon an end portion of the lower shaft 60 inwardly of and in adjacent relation to a lower annular die cutter 62 also fixed upon said lower shaft and adapted to cooperate with an upper annular die cutter 63 fixed upon an end of the upper shaft 59. The ends of the upper and lower shafts in the bearing member 58 opposite the ends having the upper and lower die cutters 63 and 62 fixedly support intermeshing gears (not shown) situated within a housing 64 upon said bearing member 58.

The electric motor 18 drives a transverse shaft 65 through the instrumentality of a first belt 66 riding a pulley on the motor shaft and also riding a pulley 67 on said transverse shaft, and the pulley 55 is driven from the transverse shaft 65 through the instrumentality of a second belt 68 riding a pulley 69 on said transverse shaft and said pulley 55. The transverse shaft 65 is supported upon an arm 70 itself adjustably supported on the machine frame.

The chain drive 31 rides the sprocket 57 thus to be driven. The transverse shaft 25, fixedly supporting the lower feed roller 24 and driven by said chain drive 31, supports a sprocket 71 with respect to which said transverse shaft is rotatably adjustable, and the chain drive 31 rides said sprocket 71. More explicitly stated, the sprocket 71 is fixed upon a tubular element 72 itself rotatably mounted, as at 73, on the machine frame and rotatably supporting, as at 74, said transverse shaft 25. An annular flange 75, integral or rigid with the tubular element 72 and in perpendicular relation thereto, is situated at a side of said machine frame adjacent a drive disc 76 keyed, as at 77, to the transverse shaft 25 to be rotatable therewith and slidable therealong. An annular element 78, clamped, as at 79, upon the drive disc is detachably connected to a marginal portion of the annular flange 75 by dowel pins 80 in said annular element and annular flange. The drive disc 76 is retained against sliding movement along the transverse shaft 25 through the medium of a fixing screw 81. When it is desired to relatively rotatably adjust the transverse shaft 25 and the sprocket 71, the fixing screw 81 will be removed from engaged relation with said transverse shaft, and the drive disc 76 will be slid outwardly to disconnect the annular flange 75 and the annular element 78. After relative adjustment of said transverse shaft and sprocket is accomplished, said annular flange and annular element will be reassembled and said fixing screw will be returned to engaged relation with the transverse shaft 25. See Fig. 12.

The transverse shaft 25 fixedly supports a sprocket 82, and a chain drive 83 rides the sprocket 82 and also rides a sprocket 84 fixed on the transverse shaft 48. The lower shaft 60 in the bearing member 58 is driven through the instrumentality of the sprocket 61 fixed on said lower shaft and a chain drive 85 riding said sprocket 61 and also riding a sprocket 86 secured for rotatable adjustment upon the transverse shaft 48 in spaced relation to the sprocket 84 by a set screw 87.

The angle pieces 20, 20 are for guiding file folders or filing guides with tabs to be cut to upper and lower die cutters such as 43, 44 and 63, 62. The angle piece 20 at the side of the machine frame adjacent the paper cutting units 45 and 46 terminates just rearwardly of the upper and lower annular die cutters 43, 44, and the construction and arrangement will be such that knife edges upon upper and lower die cutters will meet in the plane of file folders, or filing guides, fed to the die cutters. By employing more than one paper cutting unit, and spacing the paper cutting units which are employed at desired distance apart, the production of multiple tabs of any desired configuration can be accomplished. The sprocket 71 is supported upon the transverse shaft 25 for relative rotatable adjustment of said sprocket and transverse shaft to the end that the feed of file folders, or filing guides, to the die cutters by the spaced lugs 47 can be advanced or retarded, and the sprocket 86 is supported for rotational adjustment upon the transverse shaft 48 to the end that the knife edges of the annular die cutters of the unit 46 can be advanced or retarded with respect to the knife edges of the annular die cutters of the unit 45. Paper cutting units such as 45 and 46 can be utilized to produce separate cuts for providing a single tab. It will be apparent that die cutters employed in the machine may be equipped to punch holes and/or to perforate, as well as to sever.

The tab provided file folders, or filing guides, are fed from the paper cutting units 45 and 46 to a continuous conveyor belt 88 on a table 89 for receiving said file folders, or filing guides. An arm for retarding progress of the file folders, or filing guides, as they are fed to the conveyor belt is indicated 90. The table 89 supports a driven transverse shaft 91 and an idler transverse shaft 92 in spaced relation to the driven transverse shaft, and the conveyor belt 88 is mounted upon said driven and idler transverse shafts so that an upper length of said conveyor belt will be advanced in response to rotary movement of the driven transverse shaft 91. Numeral 93 indicates transverse rollers upon the table for supporting the midportion of the upper length of the conveyor belt 88.

A first rotary solenoid 94 is adapted to be successively energized and deenergized to cause the driven transverse shaft 91 to be rotated ahead step by step, thus to accomplish step by step advancement of the upper length of the continuous conveyor belt 88. The first rotary solenoid 94 drives a pinion 95 which meshes with a gear 96 fixed on a stub shaft 97 rotatably supported, as at 98, upon the table 89, and step by step ahead drive of the transverse shaft 91 is accomplished through the medium of a spring cushion connection 99 between the stub shaft 97 and said transverse shaft 91. A detent 100 upon the table 89 and engaged between teeth of the gear 96 is for precluding rearward turning movement of said gear. See Figs. 1, 2 and 3 of the drawings.

The construction and arrangement are such that the first rotary solenoid 94 becomes energized in response to feeding of each file folder, or filing guide, or other article from the machine frame 17 to the continuous conveyor belt 88, between a mirror 101 above and a photo-electric eye 102 below the elevation of the table 89, and deenergized with passage of the file folder, filing guide or article to position in advance of said mirror and photo-electric eye. After each file folder, filing guide or article is deposited upon said conveyor belt, it is moved ahead a step each time the first rotary solenoid 94 is energized. Stated differently, each succeeding file folder, filing guide or article is deposited upon the conveyor belt 88 in partially overlying relation to the next preceding file folder, filing guide or article, and with step by step advancement of the driven transverse shaft 91, the file folders, filing guides or articles are fed along step by step with the upper length of said conveyor belt, beneath the retarding arm 90, as the conveyor belt advances.

Figure 8:
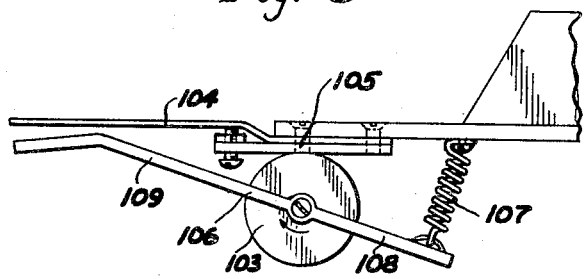
Fig. 8 is an enlarged plan view detailing operative mechanism of the machine additional to that disclosed in Figs. 2 and 3.
Figure 9:
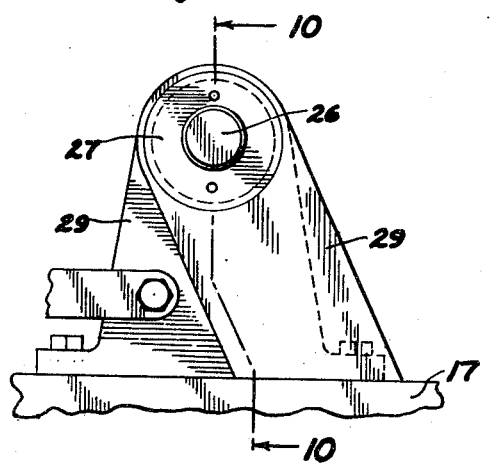
Fig. 9 is an enlarged elevational view of an adjustable mounting for a transverse shaft supporting an upper feed roller of the machine.
Figure 10:
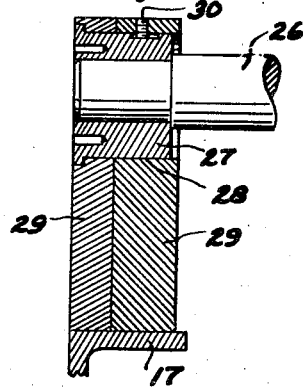
Fig. 10 is a detail sectional view, taken on line 10—10 in Fig. 9.

A second rotary solenoid 103 is adapted to be energized and deenergized each time feeding of a predetermined number of file folders, filing guides or other articles past the mirror 101 and photo-electric eye 102 is accomplished or completed. A flexible kicker arm 104 is supported, as at 105, upon the forward end of the horizontal platform to extend forwardly longitudinally therefrom. Energization of the second rotary solenoid 103, suitably and conveniently mounted on the machine frame, will actuate a lever 106, in the direction of the arrow in Fig. 8, against force of a tension coil spring 107 connected between said horizontal platform and a first arm 108 of said lever, to cause a second arm 109 of the lever to strike a blow against the flexible kicker arm, thus to cause the file folder, filing guide or other article being delivered from the horizontal platform to the conveyor belt 88 at the time said flexible kicker arm is actuated to be displaced slightly or somewhat out of longitudinal alinement with preceding and succeeding file folders, filing guides or articles. Upon deenergization of the second rotary solenoid 103, the tension coil spring 107 will return the lever 106 to its normal position, as in said Fig. 8.

A longitudinal extension 110 of the shaft 91 supports a plurality of annular elements, three as shown, represented 111, 112 and 113, respectively. The annular element 111 has thereon five radially extending protuberances, each denoted 114, spaced at 72 degrees apart; the annular element 112 has thereon four radially extending protuberances, each indicated 115, spaced at 90 degrees apart; the annular element 113 has thereon three radially extending protuberances, each represented 116, spaced at 120 degrees apart; and the protuberances upon each annular element are in a single plane disposed perpendicularly of the longitudinal extension 110.

The annular elements 111, 112 and 113 are secured to and against each other, and to and against an actuator piece 117, by means of a screw bolt 118. Said actuator piece 117 is slidably keyed, as at 119, to the longitudinal extension 110, and the construction and arrangement are such that the actuator piece and the annular elements 111, 112 and 113 are slidably adjustable along said longitudinal extension. A fixing screw 120 in the actuator piece 117 and selectively engageable in longitudinally alined indentations 121 in the longitudinal extension 110 is for fixing the unit constituted as the elements 111, 112 and 113 and 117 at any position to which said unit may be adjusted.

A micro-switch 122, suitably and conveniently mounted, as at 123, upon the table 89 includes a normally open movable switch arm 124 to be engaged with and disengaged from a fixed contact element 125 of said micro-switch. Said switch arm 124 will have its outer end portion in alinement with the path of travel of the protuberances, 114, 115 or 116, as the case may be, upon one or the other of the annular elements 111, 112 or 113, depending upon which of said annular elements selectively is made to aline with the switch arm.

Incoming wires from a source (not shown) of electrical energy to a rectifier 126 are represented 127 and 128, respectively.

A lead wire 129 extends from the incoming wire 127 to the solenoid 130 of a first relay, a lead wire 131 extends from said first relay solenoid to the photo-electric eye 102, and a lead wire 132 is connected between said photo-electric eye and the incoming wire 128.

A lead wire 133 extends from the incoming wire 127 to the solenoid 134 of a second relay, a lead wire 135 extends from said second relay solenoid to the movable switch arm 124 of the micro-switch 122, and a lead wire 136 is connected between the fixed contact element 125 of said micro-switch and the incoming wire 128.

A lead wire 137 extends from the rectifier 126 to the first rotary solenoid 94, a lead wire 138 extends from said first rotary solenoid to a fixed contact element 139 of the first relay, and a lead wire 140 extends between a movable contact element 141 of said first relay and said rectifier.

A lead wire 142 connects the lead wire 137 with the second rotary solenoid 103, a lead wire 143 extends from said second solenoid to a movable contact element 144 of the second relay, and a lead wire 145 extends between a fixed contact element 146 of said second relay and the lead wire 140.

The passage of each file folder, filing guide or other article between the mirror 101 and the photo-electric eye 102 causes a circuit to be made through the solenoid 130 of the first relay, said circuit being traced from the incoming wire 127 to said solenoid 130, and thence by the lead wire 131, the photo-electric eye 102 and the lead wire 132 to the incoming wire 128. Energization of the solenoid 130 closes the switch 139, 141 thus to complete a circuit through the first rotary solenoid 94, traced from the rectifier 126 through the lead wire 137 to said first rotary solenoid, and thence through the lead wire 138, said switch 139, 141 and the lead wire 140 to said rectifier. Energization of the first rotary solenoid advances the transverse shaft 91 a single step, and with passage of each file folder, filing guide or article beyond position where between the mirror 101 and photo-electric eye 102, the circuit including the solenoid 130 of the first relay becomes broken and the switch 139, 141 becomes open thus to cause said first rotary solenoid 94 to become deenergized.

Successive advancement of the driven transerse shaft 91 step by step of course accomplishes step by step advancement of the longitudinal extension 110 of said transverse shaft and the annular elements 111, 112 and 113 thereon. Any one of said annular elements, or other annular element having thereon less than three or more than five equally circumferentially spaced protuberances, is capable of alinement with the movable arm 124 of the micro-switch 122 merely by adjustment of the actuator piece 117 longitudinally of said extension 110 in the manner as hereinbefore described.

Each step by step advancement of the driven transverse shaft 91 will be of the same arc, and, desirably, the arc of step by step advancement may be much smaller than the arc between adjacent protuberances on any of the annular elements, such as 111, 112, 113. By way of example, supposing the arc of step by step advancement of said transverse shaft 91 to be three degrees, the micro-switch 122 will be closed, thus to cause the second rotary solenoid 103 to be energized, upon the completion of each 24 actuations of the first rotary solenoid 94 in an instance when the annular element 111 is alined with the movable switch arm 124. Similarly, when the annular element 112 is alined with said movable switch arm 124, the second rotary solenoid 103 will be energized upon the completion of each 30 actuations of three degrees each of the first rotary solenoid, and when the annular element 113 is alined with the movable switch arm 124, said second rotary solenoid will be energized upon the completion of each 40 actuations of three degrees each of said first rotary solenoid. Thus, it will be apparent, the construction and arrangement including the second rotary solenoid, etc., is provision for indicating the number of file folders, filing guides or other articles operated on from time to time in the machine, for the reason that each actuation of the first rotary solenoid occurs concurrently with delivery of an article to the coneyor belt 88 and actuation of said second rotary solenoid causes the file folder being delivered to said conveyor belt each time the second rotary solenoid is operated to be displaced or kicked out of the longitudinal line of all of the other file folders.

Each closing of the micro-switch 122 completes a circuit through the sonenoid 134 of the second relay, said circuit being traced from the incoming wire 127 by the lead wire 137 to said solenoid 134, and thence by the lead wire 135, the micro-switch elements 124, 125 and the lead wire 136 to the incoming wire 128. Energization of the solenoid 134 closes the switch 142, 144 thus to complete a circuit through the second rotary solenoid 103, traced from the rectifier 126 through the lead wires 137 and 142 to said second rotary solenoid, and thence through the lead wire 143, said switch 142, 144 and the lead wires 145 and 140 to said rectifier. Energization of the second rotary solenoid causes the lever 106 to actuate the flexible kicker arm 104 to cause the file folder, filing guide or other article at the time being delivered to the conveyor belt 88 to be displaced from alined relation to preceding file folders, filing guides or articles. With passage of each protuberance on any of the annular elements 111, 112 or 113 beyond the movable switch arm 124, in response to the next advancement of the transverse shaft 91, said movable switch arm is released and removes itself from the fixed contact element 125 to cause the circuit including the solenoid 134 of the second relay to be broken and the switch 142, 144 to become open thus to cause said second rotary solenoid 103 to become deenergized.

What is claimed is:

1. In a machine of the character described, a frame, first and second solenoids upon said frame, first and second circuits for said first and second solenoids, respectively, a conveyor upon said frame for successively receiving articles in longitudinal alinement, a shaft upon said frame rotatable step by step in response to successive energization and deenergization of said first solenoid to cause said conveyor to be advanced step by step in the direction of longitudinal advancement of said articles, an operative connection between said first solenoid and said shaft, means responsive to each of successive deliveries of articles to said conveyor for successively making and breaking said first circuit, a switch upon said frame for controlling said second circuit, an element rotatable with said shaft and operable upon said switch successively to make and break said second circuit in response to each of a series of step by step rotations of said shaft, and a kicker member upon said frame operable to displace an article upon said conveyor out of alinement with others of said articles in response to each actuation of said second solenoid.

2. In a machine of the character described, a frame, first and second solenoids upon said frame, first and second circuits for said first and second solenoids, respectively, a conveyor upon said frame for successively receiving articles in longitudinal alinement, a shaft upon said frame rotatable step by step in response to successive energization and deenergization of said first solenoid to cause said conveyor to be advanced step by step in the direction of longitudinal advancement of said articles, an operative connection between said first solenoid and said shaft, means responsive to each of successive deliveries of articles to said conveyor for successively making and breaking said first circuit, a switch upon said frame for controlling said second circuit, an element rotatable with said shaft, spaced apart actuators upon said element operable upon said switch successively to make and break said second circuit in response to each of a series of step by step rotations of said shaft, and a kicker member upon said frames operable to displace an article upon said conveyor out of alinement with others of said articles in response to each actuation of said second solenoid.

References Cited in the file of this patent

UNITED STATES PATENTS

| | | |
|---|---|---|
| 1,206,880 | Mattingly | Dec. 5, 1916 |
| 1,232,422 | Halvorsen | July 3, 1917 |
| 1,482,197 | Kimball | Jan. 29, 1924 |
| 1,548,350 | Charland | Aug. 4, 1925 |
| 1,581,583 | Low | Apr. 20, 1926 |
| 1,609,161 | Deligianes et al. | Nov. 30, 1926 |
| 1,961,724 | Zenke | June 5, 1934 |
| 1,999,292 | Halvorsen | Apr. 30, 1935 |
| 2,033,969 | Zenke | Mar. 17, 1936 |
| 2,220,270 | Page | Nov. 5, 1940 |
| 2,424,093 | Harred | July 15, 1947 |
| 2,525,311 | Peyrebrune | Oct. 10, 1950 |